US012662396B2

(12) United States Patent
Prakash et al.

(10) Patent No.: US 12,662,396 B2
(45) Date of Patent: Jun. 23, 2026

(54) SALT RECOVERY SOLUTION AND PROCESSES OF USE THEREOF

(71) Applicant: Aquafortus Technologies Limited, Auckland (NZ)

(72) Inventors: Chaitra Prakash, Auckland (NZ); Haiming Tang, Auckland (NZ); Crystal Maddox, Auckland (NZ)

(73) Assignee: Aquafortus Technologies Limited, Auckland (NZ)

( * ) Notice: Subject to any disclaimer, the term of this patent is extended or adjusted under 35 U.S.C. 154(b) by 650 days.

(21) Appl. No.: 18/013,853

(22) PCT Filed: Jul. 9, 2021

(86) PCT No.: PCT/NZ2021/050105
§ 371 (c)(1),
(2) Date: Dec. 29, 2022

(87) PCT Pub. No.: WO2022/010366
PCT Pub. Date: Jan. 13, 2022

(65) Prior Publication Data
US 2023/0286833 A1 Sep. 14, 2023

Related U.S. Application Data

(60) Provisional application No. 63/050,402, filed on Jul. 10, 2020.

(51) Int. Cl.
*C02F 1/26* (2023.01)

(52) U.S. Cl.
CPC ..................................... *C02F 1/265* (2013.01)

(58) Field of Classification Search
CPC .............................. B01D 9/0054; C02F 1/265
See application file for complete search history.

(56) References Cited

U.S. PATENT DOCUMENTS

| | | | |
|---|---|---|---|
| 2,784,173 | A | 3/1957 | Carmack |
| 3,077,500 | A | 2/1963 | Heinz et al. |
| 3,130,156 | A | 4/1964 | Neff |
| 3,164,539 | A | 1/1965 | Smith |
| 3,641,181 | A | 2/1972 | Robbins et al. |
| 3,962,074 | A | 6/1976 | Schropp |
| 4,275,234 | A | 6/1981 | Baniel et al. |
| 4,430,227 | A | 2/1984 | Hanson et al. |
| 4,624,958 | A | 11/1986 | Glazer |
| 4,789,482 | A | 12/1988 | DiLeo et al. |
| 5,186,817 | A | 2/1993 | Paspek et al. |
| 5,346,620 | A | 9/1994 | Hendrix et al. |
| 5,486,314 | A | 1/1996 | Wack et al. |
| 5,705,074 | A | 1/1998 | Brient |
| 5,780,276 | A | 7/1998 | Baniel |
| 5,897,750 | A | 4/1999 | Berg |
| 6,307,087 | B1 | 10/2001 | Buchwald et al. |
| 6,858,694 | B2 | 2/2005 | Ohnishi et al. |
| 6,858,964 | B2 | 2/2005 | Masumoto et al. |

| | | | |
|---|---|---|---|
| 7,560,029 | B2 | 7/2009 | Mc Ginnis |
| 8,143,444 | B2 | 3/2012 | Mariansky et al. |
| 9,630,861 | B2 | 4/2017 | Ikeda et al. |
| 10,933,377 | B2 | 3/2021 | Briggs et al. |
| 11,020,706 | B2 | 6/2021 | Briggs |
| 11,826,704 | B2 | 11/2023 | Briggs |
| 11,987,506 | B2 | 5/2024 | Briggs et al. |
| 2002/0156295 | A1 | 10/2002 | Buchwald et al. |
| 2003/0004202 | A1 | 1/2003 | Elliott et al. |
| 2006/0086664 | A1 | 4/2006 | Wills |
| 2012/0043274 | A1 | 2/2012 | Chi et al. |
| 2012/0241377 | A1 | 9/2012 | Ooi et al. |
| 2013/0012738 | A1 | 1/2013 | Wu et al. |
| 2013/0240444 | A1 | 9/2013 | Jung et al. |
| 2014/0076810 | A1 | 3/2014 | Jessop et al. |

(Continued)

FOREIGN PATENT DOCUMENTS

| | | |
|---|---|---|
| AU | 2018346086 A1 | 5/2020 |
| CA | 1208134 A | 7/1986 |

(Continued)

OTHER PUBLICATIONS

Guo, C. et al., Structural Characteristic Integrated Computer-Aided Molecular Design for Phenols Removal Considering Synergistic Effect, Industrial & Engineering Chemistry Research, vol. 57:11374-11380 (2018).
International Preliminary Report on Patentability, PCT/NZ2021/050105, dated Jan. 10, 2023, 8 pages.
International Search Report and Written Opinion, PCT/NZ2021/050105, dated Oct. 5, 2021, 11 pages.
Li, H-B. et al., Preparative isolation and purification of salidroside from the Chinese medicinal plant Rhodiola sachalinensis by high-speed counter-current chromatography, Journal of Chromatography A,, vol. 932: 91-95 (2001).

(Continued)

*Primary Examiner* — Bradley R Spies

(74) *Attorney, Agent, or Firm* — Nelson Mullins Riley & Scarborough LLP; Jane E. Remillard, Esq.; Jill Gorny Sloper, Esq.

(57) ABSTRACT

The present invention relates to a salt recovery solution and to a process for separating a salt from an aqueous solution. The present disclosure also relates to a salt recovery solution and to its use to concentrate a salt or brine solution by recovering water therefrom. The salt recovery solution comprising at least two or more components independently selected from any combination of integers a), b), c) and d): where a) is a straight, branched or optionally substituted cyclic $C_4$-$C_9$ ether containing compound; b) is a straight chain or branched $C_3$-$C_9$ alkyl substituted by —OH; c) is a straight chain, branched or cyclic $C_4$-$C_9$ ketone or $C_4$-$C_9$ diketone; and d) is a straight chain or branched $C_3$-$C_9$ ester containing compound.

18 Claims, 2 Drawing Sheets

(56) References Cited

U.S. PATENT DOCUMENTS

| | | | |
|---|---|---|---|
| 2014/0158621 A1 | 6/2014 | Lee et al. | |
| 2014/0290854 A1 | 10/2014 | Parellada Llobet et al. | |
| 2014/0319056 A1 | 10/2014 | Fuchigami et al. | |
| 2015/0108061 A1 | 4/2015 | Chi et al. | |
| 2015/0166363 A1 | 6/2015 | Eyal et al. | |
| 2015/0273396 A1 | 10/2015 | Hancock et al. | |
| 2015/0360973 A1 | 12/2015 | Eyal et al. | |
| 2016/0023171 A1 | 1/2016 | Phillip et al. | |
| 2016/0158705 A1 | 6/2016 | Helm et al. | |
| 2016/0175777 A1 | 6/2016 | Ikeda et al. | |
| 2017/0305823 A1 | 10/2017 | Fischer et al. | |
| 2017/0354904 A1 | 12/2017 | Wilson et al. | |
| 2018/0008933 A1 | 1/2018 | Hu et al. | |
| 2018/0015414 A1 | 1/2018 | Hu et al. | |
| 2018/0142117 A1 | 5/2018 | Resendes et al. | |
| 2019/0099718 A1 | 4/2019 | Briggs et al. | |
| 2020/0023316 A1 | 1/2020 | Briggs | |
| 2020/0308023 A1 | 10/2020 | Briggs et al. | |
| 2022/0185754 A1 | 6/2022 | Briggs et al. | |
| 2022/0193608 A1 | 6/2022 | Briggs | |
| 2023/0043356 A1 | 2/2023 | Prakash et al. | |
| 2023/0257284 A1 | 8/2023 | Briggs et al. | |
| 2023/0286833 A1 | 9/2023 | Prakash et al. | |
| 2024/0262772 A1 | 8/2024 | Prakash et al. | |
| 2024/0368001 A1 | 11/2024 | Briggs et al. | |

FOREIGN PATENT DOCUMENTS

| | | | |
|---|---|---|---|
| CN | 1156418 A | 8/1997 | |
| CN | 1717386 A | 1/2006 | |
| CN | 104619649 A | 5/2015 | |
| CN | 104984562 A | 10/2015 | |
| CN | 106727143 A | 5/2017 | |
| CN | 106942264 A | 7/2017 | |
| CN | 108186380 A | 6/2018 | |
| CN | 110099869 A | 8/2019 | |
| DE | 10 2018 119168 A1 | 2/2019 | |
| EP | 0117870 A1 | 9/1984 | |
| EP | 1236751 A1 | 9/2002 | |
| JP | S5610131 A | 2/1981 | |
| JP | H02-49195 A | 2/1990 | |
| JP | H04266845 A | 9/1992 | |
| JP | 2007-511472 A | 5/2007 | |
| JP | 2009200349 A | 9/2009 | |
| JP | 2013 518718 A | 5/2013 | |
| WO | 2004050601 A2 | 6/2004 | |
| WO | 2011/014850 A2 | 2/2011 | |
| WO | 2011/028629 A1 | 3/2011 | |
| WO | 2013/016491 A1 | 1/2013 | |
| WO | 2013/016499 A1 | 1/2013 | |
| WO | 2013175380 A1 | 11/2013 | |
| WO | 2014089142 A1 | 6/2014 | |
| WO | 2014191504 A1 | 12/2014 | |
| WO | 2014191522 A1 | 12/2014 | |
| WO | 2016094835 A1 | 6/2016 | |
| WO | 2016133464 A1 | 8/2016 | |
| WO | 2018067019 A2 | 4/2018 | |
| WO | 2019/070134 A2 | 4/2019 | |
| WO | 2020/204733 A1 | 10/2020 | |
| WO | 2021/247354 A1 | 12/2021 | |
| WO | 2022/010366 A1 | 1/2022 | |
| WO | 2022/010367 A1 | 1/2022 | |

OTHER PUBLICATIONS

Walsham, J. G., "Prediction of Flash Points for Solvent Mixtures" Advances in Chemistry, vol. 124, chapter 5: 56-69 (1973).

U.S. Appl. No. 18/093,263, filed Jan. 4, 2023, Daryl Joseph Briggs, US 20230257284.

U.S. Appl. No. 16/753,263, filed Apr. 2, 2020, Daryl Joseph Briggs, US 20200308023.

U.S. Appl. No. 18/013,853, filed Dec. 29, 2022, Chaitra Prakash.

U.S. Appl. No. 18/013,852, filed Dec. 29, 2022, Chaitra Prakash.

U.S. Appl. No. 17/599,284, filed Sep. 28, 2021, Chaitra Prakash, US 20230043356.

U.S. Appl. No. 17/436,439, filed Sep. 3, 2021, Daryl Joseph Briggs, US 20220185754.

U.S. Appl. No. 17/246,440, filed Apr. 30, 2021, Daryl Joseph Briggs, US 20220193608.

U.S. Appl. No. 16/338,076, filed Mar. 29, 2019, Daryl Joseph Briggs, U.S. Pat. No. 11,020,706.

U.S. Appl. No. 16/145,968, filed Sep. 28, 2018, Daryl Joseph Briggs, U.S. Pat. No. 10,933,377.

Alonso, I. , et al., "Thermodynamics of Ketone + Amine Mixtures. Part III. Volumetric and Speed of Sound Data at (293.15, 298.15, and 303.15) K for 2-Butanone + Aniline, + N-Methylaniline, or + Pyridine Systems," J. Chem. Eng. Data, vol. 55: 5400-5405 (2010).

Bahadur Alisha, S. et al., "Ultrasonic Studies on Binary Liquid Mixtures of Triethylamine with Carbitols at 308.15 K," Indian Journal of Advances in Chemical Science, vol. 5(3): 148-154 (2017).

CAS Registry No. 183205-66-5; STN Entry date Nov. 20, 1996; Ethanesulfonic acid, 2-hydroxy-, compd. with N,N-diethylethanamine (1:1). Retrieved on May 18, 2020.

Deshpande, M., "Polyol induced extraction (PIE) of water from organic solvents,"), Seton Hall University Dissertations and Theses (ETDs). No 1989. (2014) Retrieved from the Internet on Sep. 21, 2021 via <URL:https://scholarship.shu.edu/dissertations/1989/-retrieved on Sep. 21, 2021.

Extended European Search Report, European Application No. 20768998, dated Nov. 4, 2022, 9 pages.

Extended European Search Report, European Application No. 21837257. 1, dated Apr. 3, 2024, 8 pages.

González, J.-A., et al. "Thermodynamics of ketone + amine mixtures. Part X. Excess molar enthalpies at 298.15 K for N, N, N-triethylamine + 2-alkanone systems. Characterization of tertiary amine + 2-alkanone, and of amino-ketone + n-alkane mixtures in terms of DISQUAC," Fluid Phase Equilibria, vol. 356: 117-125 (2013).

Govindarajan, M. et al., "Salt effect on liquid-liquid equilibrium of the methyl isobutyl ketone-acetic acid-water system at 35 °C," Fluid Phase Equilibria, vol. 108: 269-292 (1995).

Gutierrez, E. et al., "Phase segregation in aqueous solutions of non-ionic surfactants using ammonium, magnesium and iron salts", The Journal of Chemical Thermodynamics, vol. 70: 147-153 (2014).

Hyde, A.M., et al., "General Principles and Strategies for Salting-Out Informed by the Hofmeister Series," Organic Process Research and Development, vol. 21:1335-1370 (2017).

International Preliminary Report on Patentability, PCT/NZ2017/050127, dated Apr. 9, 2019, 6 pages.

International Preliminary Report on Patentability, PCT/NZ2018/050135, dated Apr. 8, 2020, 8 pages.

International Preliminary Report on Patentability, PCT/NZ2020/050019, dated Aug. 25, 2021, 4 pages.

International Preliminary Report on Patentability, PCT/NZ2021/050106, dated Jan. 10, 2023, 13 pages.

International Search Report and Written Opinion, PCT/NZ2017/050127, dated Jan. 22, 2019, 8 pages.

International Search Report and Written Opinion, PCT/NZ2018/050135, dated Nov. 14, 2019, 11 pages.

International Search Report and Written Opinion, PCT/NZ2020/050019, dated Jun. 10, 2020, 7 pages.

International Search Report and Written Opinion, PCT/NZ2021/050106, dated Oct. 5, 2021, 21 pages.

Matkovich, C.E. et al., "Salting-Out of Acetone from Water—Basis of a New Solvent Extraction System," Analytical Chemistry, vol. 45(11): 1915-1921 (1973).

Munson, C. L. et al. "Factors influencing Solvent Selection for Extraction of Ethanol from Aqueous Solutions," Ind. Eng. Chem. Process Des. Dev., vol. 23 (1): 109-115 (1984).

Reddy, K.C. et al., "Ultrasonic Behavior of Binary Liquid Mixtures Containing Triethy lamine, Part 1," Trans. Faraday Soc., vol. 58: 2352-2357 (1962).

SALT RECOVERY SOLUTION AND PROCESSES OF USE THEREOF

CROSS-REFERENCE TO RELATED APPLICATIONS

This application is a 35 U.S.C. § 371 national stage filing of International Application No. PCT/NZ2021/050105, filed Jul. 9, 2021, which claims priority to U.S. Provisional Application No. 63,050,402, filed Jul. 10, 2020. The contents of the aforementioned applications are hereby incorporated by reference in their entirety.

FIELD OF THE INVENTION

The present disclosure relates to a salt recovery solution and to a process for separating a salt from an aqueous solution. The present disclosure also relates to a salt recovery solution and to its use to concentrate a salt or brine solution by recovering water therefrom.

BACKGROUND OF THE INVENTION

The extraction of salts from an aqueous solution is typically a high energy and time consuming process, requiring removal of water and salt crystallisation. As reported in 2016 by Tong et al. American Chemical Society 6846 DOI: 10.1021/acs.est.6b01000 Environ. Sci. Technol. 2016, 50, 6846-6855, Zero liquid discharge (ZLD) is an ambitious wastewater management strategy that eliminates any liquid waste leaving the plant or facility boundary, with the majority of water being recovered for reuse. Achieving ZLD, however, is generally characterized by intensive use of energy and high cost. As a result, ZLD has long been considered technically but not economically viable and has been applied only in limited cases. In recent years, greater recognition of the dual challenges of water scarcity and pollution of aquatic environments has revived global interest in ZLD. More stringent regulations, rising expenses for wastewater disposal, and increasing value of freshwater are driving ZLD to become a beneficial or even a necessary option for wastewater management. The global market for ZLD is estimated to reach an annual investment of at least $100-200 million spreading rapidly from developed countries in North America and Europe to emerging economies such as China and India. Early ZLD systems were based on stand-alone thermal processes, where wastewater was typically evaporated in a brine concentrator followed by a brine crystallizer or an evaporation pond. The condensed distillate water in ZLD systems is collected for reuse, while the produced solids are either sent to a landfill or recovered as valuable salt by-products. Such systems, which have been in successful operation for 40 years and are still being built, require considerable energy and capital. Reverse osmosis (RO), a membrane-based technology widely applied in desalination, has been incorporated into ZLD systems to improve energy and cost efficiencies. However, RO, although much more energy efficient than thermal evaporation, can be applied only to feedwaters with a limited salinity range. Accordingly, other salt-concentrating technologies that can treat higher salinity feedwaters, such as electrodialysis (ED), forward osmosis (FO), and membrane distillation (MD), have emerged recently as alternative ZLD technologies to further concentrate wastewater beyond RO. Although ZLD holds great promise to reduce water pollution and augment water supply, its viability is determined by a balance among the benefits associated with ZLD, energy consumption, and capital/operation costs.

It is an object of the present invention to provide a solution that overcomes these difficulties or to at least provide a useful alternative.

SUMMARY OF THE INVENTION

In a first aspect, the present invention provides a salt recovery solution suitable for recovering a salt from a salt containing aqueous solution, the salt recovery solution comprising at least two or more components independently selected from any combination of integers a), b), c) and d): where a) is a straight, branched or optionally substituted cyclic $C_4$-$C_9$ ether containing compound;

b) is a straight chain or branched $C_3$-$C_9$ alkyl substituted by —OH;

c) is a straight chain, branched or cyclic $C_4$-$C_9$ ketone or $C_4$-$C_9$ diketone; and d) is a straight chain or branched $C_3$-$C_9$ ester containing compound;

wherein at least one component of the salt recovery solution is substantially immiscible with an aqueous solution of sodium chloride at a 1 molar concentration at or above 20 degrees Celsius and at 1 atmosphere.

In one embodiment the ether containing compound may be a diether or polyether.

In one embodiment the $C_4$-$C_9$ ether containing compound is selected from one or more of 2-methyltetrahydrofuran, 3-methyltetrahydrofuran, 2-ethyltetrahydrofuran, 3-ethyltetrahydrofuran, dioxane, 2,2-dimethoxy propane, 2-phenoxyethanol, 1-ethoxypropane, and a $C_4$-$C_9$ glycol ether or combinations thereof.

In one embodiment the straight chain or branched $C_3$-$C_9$ alkyl substituted by —OH is selected from one or more of 1-butanol, 2, butanol and 1-pentanol or combinations thereof.

In one embodiment the $C_4$-$C_9$ glycol ether is selected from one or more of propylene glycol methyl ether, dipropyleneglycol dimethyl ether (and isomeric mixtures thereof), dipropylene glycol methyl ethyl acetate, dipropylene glycol n-propyl ether, propylene glycol n-butyl ether, dipropylene glycol n-butyl ether, tripropylene glycol n-butyl ether, propylene glycol phenyl ether, propylene glycol diacetate or combinations thereof.

In one embodiment the $C_4$-$C_9$ ketone or diketone is selected from one or more of acetonylacetone, 2-butanone or cyclohexanone.

In one embodiment the $C_3$-$C_9$ ester is ethyl acetate or methyl acetate.

In one embodiment the salt recovery solution is a combination of 2-methyltetrahydrofuran and acetonylacetone.

In one embodiment the salt recovery solution is a combination of 2-methyltetrahydrofuran and 1-butanol.

In one embodiment the salt recovery solution is a combination of 2-methyltetrahydrofuran and 1-pentanol.

In one embodiment the salt recovery solution is a combination of ethyl acetate and 2-butanone.

In one embodiment the salt recovery solution is a combination of ethyl acetate and 2-methyltetrahydrofuran.

In one embodiment the salt recovery solution is a combination of ethyl acetate and 1-butanol.

In one embodiment the salt recovery solution is a combination of ethyl acetate and acetonylacetone.

In one embodiment the salt recovery solution is a combination of methyl acetate and 2-butanone.

In one embodiment the salt recovery solution is a combination of ethyl acetate and 2-phenoxyethanol.

In one embodiment the salt containing aqueous solution is an industrial brine.

In another aspect, the present invention provides a process for recovering a salt from an aqueous solution, the process including the step of (a) adding the salt containing first aqueous solution to a salt recovery solution; and (b) allowing the salt to precipitate on passage through the salt recovery solution.

In one embodiment the process is a zero-liquid discharge process.

In one embodiment the process is a counter current process.

In one embodiment the process is a non-membrane process.

In one embodiment the process is a non-osmotic process.

In another aspect, the present invention provides a process for concentrating a salt containing aqueous solution, the process comprising the steps of:

(a) adding the salt containing aqueous solution to a salt recovery solution as defined above; and (b) allowing water from the salt containing aqueous solution to pass into the salt recovery solution.

In one embodiment the precipitated salt forms part of an aqueous layer distinct from the salt recovery solution.

In one embodiment the process is a non-membrane process.

In one embodiment the process is a non-osmotic process.

In one embodiment the process is a non-membrane and non-osmotic process.

In one embodiment the process concentrates the first aqueous solution by at least 20%. In other embodiments the process concentrates the first aqueous solution by at least 30%, or by at least 40%, or by at least 50% or by at least 60%, or by at least 70% or by at least 80% or by at least 90%.

In one embodiment the process is a minimal discharge process.

In one embodiment the process is a zero-liquid discharge process.

In one embodiment the aqueous solution is an industrial brine.

The foregoing brief summary broadly describes the features and technical advantages of certain embodiments of the present invention. Further technical advantages will be described in the detailed description of the invention and examples that follows.

Novel features that are believed to be characteristic of the invention will be better understood from the detailed description of the invention when considered in connection with any accompanying figures and examples. However, the figures and examples provided herein are intended to help illustrate the invention or assist with developing an understanding of the invention, and are not intended to limit the invention's scope.

4

DETAILED DESCRIPTION OF THE INVENTION

Figure 1:
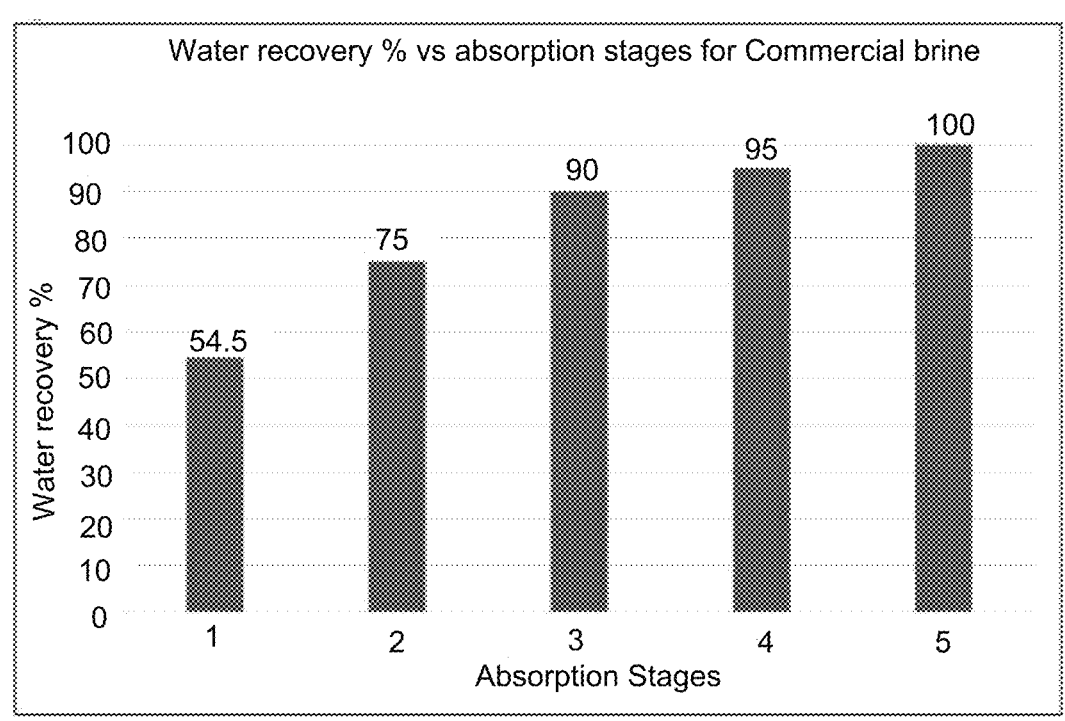
FIG. 1 shows schematically a plot of the water recovery percentage for each state of a 5 stage counter current absorption process for a commercial brine.

The following description sets forth numerous exemplary configurations, parameters, and the like. It should be recognised, however, that such description is not intended as a limitation on the scope of the present invention but is instead provided as a description of exemplary embodiments.

Definitions

In each instance herein, in descriptions, embodiments, and examples of the present invention, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

The term "about" or "approximately" usually means within 20%, more preferably within 10%, and most preferably still within 5% of a given value or range. Alternatively, the term "about" means within a log (i.e., an order of magnitude) preferably within a factor of two of a given value.

The term "minimal discharge" as used herein, means a salt water or brine treatment process where minimal effluent or discharge is left over.

The term "brine" or "brine solution" as used throughout the specification means an aqueous solution having a concentration of a salt in the water. The salt in the water could include sodium chloride, aluminium sulfate or the like, however, a wide range of salt solutions are envisaged that could include any number of a range of cations and anions. The concentration of the salt in the aqueous solution may range from about 3.5% (typical concentration of seawater) through to much higher concentrations, such as 25%, which would include a salt water solution used for brining foods. Other brine waste water solutions from textile processing, the semiconductor industry or oil, mining and gas industry would also be applicable for use with the current salt recovery solution and processes defined herein.

As used herein, the term zero liquid discharge, as used throughout the specification, means a wastewater treatment process where no effluent, or discharge, is left over.

As used herein, the term "$C_3$-$C_9$ alkyl" refers to a fully saturated branched or unbranched hydrocarbon moiety, which may be a straight or a branched chain of a particular range of 3-9 carbons. Preferably the alkyl comprises 3 to 7 carbon atoms, or 3 to 6 carbon atoms. Representative examples of $C_3$-$C_9$ alkyl include, but are not limited to n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, and the like.

The term "$C_4$-$C_9$ ether containing compound" as used herein is a 4-, 5-, 6-, 7-, 8- or 9-membered saturated, unbranched, branched, or cyclic ether. Representative unbranched $C_4$-$C_9$ ether groups include, but are not limited to, methoxyethane, 1-methoxypropane, 1-methoxybutane, 1-methoxypentane, 1-methoxyhexane, 1-methoxyheptane and 1-methoxyoctane, ethoxyethane, 1-ethoxypropane, 1-ethoxybutane, 1-ethoxypentane, 1-ethoxyhexane, 1-ethoxyheptane, 1-propoxypropane, 1-propoxybutane, 1-propoxypentane, 1-propoxyhexane, 1-butoxybutane, 1-butoxypentane, Representative branched $C_4$-$C_9$ ether groups include, but are not limited to: 2-methoxypropane, 2-ethoxypropane, 1-isopropoxypropane, 1-isopropoxybutane, 1-isopropoxypentane, 1-isopropoxyhexane, 2-methoxy-2-methylpropane, 2,2-dimethoxypropane, 2-ethoxy-2-methylpropane, 2-methyl-2-propoxypropane, 1-(tert-butoxy)butane, 1-(tert-butoxy)pentane, 2-(tert-butoxy)-2-methylpropane, 2-isopropoxy-2-methylpropane, 2-(tert-butoxy)butane, 1-(tert-butoxy)-2,2-dimethylpropane. Representative cyclic $C_4$-$C_9$ ether groups include, but are not limited to: oxetane, tetrahydrofuran, 2-methyltetrahydrofuran, 3-methyltetrahydrofuran, 2-ethyltetrahydrofuran, 3-ethyltetrahydrofuran, 2-methyltetrahydro-2H-pyran, 3-methyltetrahydro-2H-pyran, 4-methyltetrahydro-2H-pyran, 2,4-dimethyltetrahydro-2H-pyran, 2-ethyltetrahydro-2H-pyran, 3-ethyltetrahydro-2H-pyran, 4-ethyltetrahydro-2H-pyran, oxepane, oxocane, oxanane, 1,3 dioxolane, dioxane, 1,4-dioxepane, 1,5-dioxocane, 1,5-dioxanane and 2-phenoxyethanol. In one embodiment, the $C_4$-$C_9$ ether containing compound may be substituted with one or more —OH. In one embodiment the $C_4$-$C_9$ ether containing compound may be a diether or a polyether, such as 2,2-dimethoxy propane.

The term "$C_4$- to $C_9$- ketone or diketone" refers to a $C_4$- to $C_9$- membered straight chain, branched or cyclic compound containing one or two ketone functional group. Representative examples of a $C_4$- to $C_9$- membered ketone include, but are not limited to butanone, pentanone, hexanone, cyclohexanone, 4-methylcyclohexanone, heptanone, 1,2-diketones, 2,3-pentandione, octanone, nonanone, heptane-2,6-dione, acetonylacetone, and methylethylketone and the like.

The term "$C_3$-$C_9$ ester containing compound" as used herein is a 4-, 5-, 6-, 7-, 8- or 9-membered saturated, unbranched, branched, ester. Representative $C_3$-$C_9$ ester containing compounds as used herein include but are not limited to methyl acetate, ethyl acetate, propylacetate, methyl propionate, ethyl propionate, propyl propionate, butyl propionate, butyl butyrate, isopentyl acetate, 3,3-dimethylbutyl acetate, 3,3-dimethylbutyl propionate, isopropyl propionate, tert-butyl propionate; ethyl propionate, methyl pivlate, ethyl pivalate.

The term "$C_4$-$C_9$ glycol ether" as used herein is a 4-, 5-, 6-, 7-, 8- or 9-membered saturated, unbranched, branched, or glycol ether which includes without limitation from propylene glycol methyl ether, dipropylene glycol methyl ethyl acetate, dipropyleneglycol dimethyl ether (and isomeric mixtures thereof), dipropylene glycol n-propyl ether, propylene glycol n-butyl ether, dipropylene glycol n-butyl ether, tripropylene glycol n-butyl ether, propylene glycol phenyl ether, propylene glycol diacetate.

The present disclosure provides a salt recovery solution suitable for recovering a salt from an aqueous solution, such as an industrial brine. The salt recovery solution as disclosed is suitable for brines that are quite acidic, although it is to be appreciated that the salt recovery solution described can be used across a wide pH range. The salt recovery solution as described is also suitable for use with brines that have very high dissolved salts that tend towards supersaturated solutions. Industrial brines can be very variable in nature. It is to be appreciated that any inorganic cation or inorganic anion and combinations thereof can create an inorganic salt and it is envisaged that this disclosure has application to all such salts. It is envisaged that a very wide range of salts may be recoverable from an aqueous solution using a salt recovery solution described herein. By way of a non-limiting example, a typical industrial brine may have a composition such as the following involving a number of different salts:

| Salt | Concentration (g/L) |
|---|---|
| Aluminium sulfate($Al_2(SO_4)_3$) | 65.8 |
| Calcium chloride ($CaCl_2$) | 2.0 |
| Calcium sulfate ($CaSO_4$) | 1.5 |
| Iron sulfate ($FeSO_4$) | 25.0 |
| Magnesium sulfate ($MgSO_4$) | 80.0 |
| Total TDS, g/L | 174.3 |

Recovering or precipitating salt from an industrial brine or an aqueous solution aids in releasing water within the brine or aqueous solution and frees the water for subsequent water recovery. The extraction or recovery of water from waste aqueous solutions is desirable, with the ultimate goal being to recover or extract substantially all the water from an aqueous system to lead to minimal liquid discharge or zero liquid discharge (ZLD). The salt recovery solutions as described act by extracting the water from the aqueous solution, in other words, the water migrates from the aqueous solution into the salt recovery solution. In doing so, the salt which had been dissolved in the aqueous solution and has now lost its solvent (water) precipitates out. The water that has migrated into the salt recovery solution can be separated and recovered from the salt. This leads to a viable energy efficient process of physically separating the salt and the water from a brine solution The salt recovery solution comprises at least two or more components independently selected from any combination of integers a), b), c) and d) where:

a) is a straight, branched or optionally substituted cyclic $C_4$-$C_9$ ether containing compound;

b) is a straight chain or branched $C_3$-$C_9$ alkyl substituted by —OH; and c) is a straight chain or branched $C_4$-$C_9$ ketone or $C_4$-$C_9$ diketone; and d) is a straight chain or branched $C_3$-$C_9$ ester containing compound;

wherein at least one component of the salt recovery solution is substantially immiscible with an aqueous solution of sodium chloride at a 1 molar concentration at or above 20 degrees Celsius and at 1 atmosphere.

A number of combinations of components have been found to be suitable as salt recovery solutions. These combinations include but are not limited to:

A combination of a substituted cyclic $C_4$-$C_9$ ether containing compound and a $C_4$-$C_9$ diketone;

A. A combination of a substituted cyclic $C_4$-$C_9$ ether containing compound and a straight chain $C_3$-$C_9$ alkyl substituted by —OH;

B. A combination of a $C_3$-$C_9$ ester and a straight chain $C_3$-$C_9$ alkyl substituted by —OH;

C. A combination of a $C_3$-$C_9$ ester and a $C_4$-$C_9$ diketone;

D. A combination of a substituted cyclic $C_4$-$C_9$ ether containing compound, a straight chain $C_3$-$C_9$ alkyl substituted by —OH; and a straight chain $C_3$-$C_9$ alkyl substituted by —OH;

E. A combination of a substituted cyclic $C_4$-$C_9$ ether containing compound, a $C_4$-$C_9$ diketone and a straight chain $C_3$-$C_9$ alkyl substituted by —OH;

F. A combination of a substituted cyclic $C_4$-$C_9$ ether containing compound, a $C_4$-$C_9$ diketone and a $C_3$-$C_9$ alkyl substituted by —OH;

G. A combination of 2-methyltetrahydrofuran and acetonylacetone;

H. A combination of 2-methyltetrahydrofuran and 1-butanol;

I. A combination of 2-methyltetrahydrofuran and 2-butanol;
J. A combination of 2-methyltetrahydrofuran and 1-pentanol;
K. A combination of 2-methyltetrahydrofuran and methylethylketone;
L. A combination of ethyl acetate and acetonylacetone;
M. A combination of ethyl acetate and 1-butanol;
N. A combination of 2-methyltetrahydrofuran, 1-butanol and acetonylacetone;
O. A combination of 2-methyltetrahydrofuran; 1-butanol and 1-propanol;
P. A combination of 2-methyltetrahydrofuran, 1-butanol and 3-methyl-1-butanol;
Q. A combination of 2-methyltetrahydrofuran; 1-butanol and 1,4-butandiol;
R. A combination of methyl acetate and 2-butanone;
S. A combination of ethyl acetate and di(propylene glycol) dimethyl ether (isomeric mixture);
T. A combination of ethyl acetate and 2-phenoxyethanol;
U. A combination of ethyl acetate and 2-dimethoxypropane;
V. A combination of ethyl acetate and cyclohexanone; and
W. A combination of 2-methyltetrahydrofuran and methyl acetate.

The components as defined above create a solution into which water can readily migrate. The molar ratios of the components of the salt recovery solution can vary widely, however, there are preferred molar ratios that can be determined for each combination of components. The molar ratios can vary anywhere from 1:99 or 99:1 of the respective combination of components. More preferably, the molar ratio can be from about 1:50 or 50:1; or about 1:30 or 30:1; or about 1:10 or 10:1; or about 1:5 or 5:1; or about 1:3 or 3:1; or about 1:2 or 2:1 or about 1:1.

It is to be understood that it is possible to optimise the molar ratio combinations for the particular combination but also for a particular aqueous solution. In one embodiment the molar ratio combinations of some specific combinations for a simple salt solution comprising 300 g/litre of sodium chloride were found to be optimised as follows:

A. A combination of 2-methyltetrahydrofuran and acetonylacetone, in a molar ratio of about 1:1 to about 1:10, or a molar ratio of about 2:1 to about 3:2;
B. A combination of 2-methyltetrahydrofuran and 1-butanol, in a molar ratio of about 1:1 to about 1:10 or about 3:2 to about 3:7 or about 2:1 to about 3:2;
C. A combination of 2-methyltetrahydrofuran and 1-pentanol in a molar ratio of about 1:1 to about 1:10 or a molar ratio of about 2:1 to about 3:2,
D. A combination of ethyl acetate and 2-butanone in a molar ratio of about 1:1 to about 1:10.
E. A combination of ethyl acetate and 2-methyltetrahydrofuran in a molar ratio of about 1:1 to about 1:10.
F. A combination of ethyl acetate and 1-butanol in a molar ratio of about 1:1 to about 1:10.
G. A combination of ethyl acetate and acetonylacetone in a molar ratio of about 1:1 to about 1:10.

The optimised molar ratios are those molar ratios that will lead to the quickest and most efficient passage or extraction of water from the salt containing aqueous solution into the salt recovery solution. This means that the zero liquid discharge target can be achieved more easily with an optimised molar ratio. The ZLD ratio is the amount of salt recovery solution that is needed to be added to extract all the water from the original aqueous solution. The lower the ZLD ratio the more efficient the extraction of water from the salt containing aqueous solution and the less salt recovery solution required. A ZLD ratio of less than about 50 is preferred. While ZLD ratios higher than 50 will also work, it will just take greater volumes of salt recovery solution to achieve ZLD.

It is also to be appreciated that it is important when choosing the components for the salt recovery solution that minimal or no salt crossover is seen into the salt recovery solution. The purpose of the solution is to separate the salt from the water of the salt containing aqueous solution. Accordingly, the most desirable combinations will also be determined by those that exhibit minimal salt cross over at the molar ratios chosen. This will vary from salt recovery solution to salt recovery solution.

In another aspect, the present invention provides a process for concentrating a salt containing aqueous solution, the process comprising the steps of:
(a) adding the salt containing aqueous solution to a salt recovery solution as defined above; and
(b) allowing water from the salt containing aqueous solution to pass into the salt recovery solution.

In one embodiment the process does not require a membrane to achieve the separation of the salt from the water.

In one embodiment the process is a non-osmotic process.

In one embodiment the process concentrates the first aqueous solution by at least 20%. In other embodiments the process concentrates the first aqueous solution by at least 30%, or by at least 40%, or by at least 50% or by at least 60%, or by at least 70% or by at least 80% or by at least 90%.

In one embodiment the process is a minimal discharge process, preferably a zero-liquid discharge process.

In one embodiment the aqueous solution is an industrial brine.

In a further embodiment the salt recovery solution is recovered by removing the water extracted into it. This process can be done using known techniques for removing water or releasing water from the salt recovery solution. Once the water has been removed from the salt recovery solution it can be recycled for use in a further separation process. The process may be converted into a continuous process. The process could be utilized on a large scale. Suitable processes for removing water or releasing water from the salt recovery solution are described in PCT/NZ2020/050034, published as WO/2020/204733, the contents of the specification are herein incorporated by reference.

It is to be appreciated that the process may include the further step of adding an additive to the salt recovery solution to further release water held within the salt recovery solution. In one embodiment the additive is citric acid. In one embodiment the citric acid is a concentrated solution of citric acid comprising between about 200-450 gms of citric acid per litre of water. In another embodiment the citric acid is anhydrous citric acid added directly to the salt recovery solution.

It is to be appreciated that the molar ratio of the at least one component of a) to c) with the other component independently selected from a) to c) are present in a ratio of about 1:99 or 99:1. may be from about 1:99 or 99:1; or from about 1:50 or 50:1 or from about 1:10 or 10:1 or from about 1:5 or 5:1 or from about 1:3 or from about 3:1 or from about 1:2 or from about 2:1. In a preferred embodiment the molar ratio is about 1:1. A chemistry technician would be able to routinely determine the most suitable molar ratio depending on the purpose for which the salt recovery solution is to be employed.

In a further embodiment the salt containing aqueous solution is salt water or a brine solution.

It is to be appreciated that the salt containing aqueous solution may need an optional pre-treatment step prior to being exposed to the salt recovery solution. Such pre-treatment may require a filtering step to remove any undissolved solids or clays, for example.

EXAMPLES

The examples described herein are provided for the purpose of illustrating specific embodiments of the invention and are not intended to limit the invention in any way. Persons of ordinary skill can utilise the disclosures and teachings herein to produce other embodiments and variations without undue experimentation. All such embodiments and variations are considered to be part of this invention.

Examples—Preparation and Testing of a Range of Salt Recovery Solutions

The salt recovery solutions were all made using two components—component A and component B. For each type of salt recovery solution, the component A and component B were varied according to the molar ratios. The resulting solution was mixed with salt containing aqueous solution (brine). The ratio at which there was complete salt precipitation i.e., zero-liquid discharge (ZLD) condition was determined.

Standard salt solution was used as the aqueous solution. It was prepared by dissolving sodium chloride (NaCl) in water at a concentration of 300 000 ppm.

Compounds used in the formulation of salt recovery solution were: 2-Methyltetrahydrofuran (MeTHF), 1-butanol, 2,5-hexanedione (Acetonylacetone), 1-pentanol, ethanol acetate and 2-butanone.

Apparatus used: After adding the brine solution to the salt recovery solution, the samples were mixed in vortex mixer for 30 seconds. After ensuring thorough mixing, these samples were centrifuged at 4000 rpm for 1 minute for the precipitated salts to settle at the bottom of the sample tubes.

The following table shows the different compounds used in preparing the salt recovery solutions:

TABLE 1

Different examples of salt recovery solution compositions:

| Example No. | Component A | Component B |
|---|---|---|
| 1 | MeTHF | Acetonylacetone |
| 2 | MeTHF | 1-Butanol |
| 3 | MeTHF | 1-Pentanol |
| 4 | Ethyl acetate | 2-Butanone |
| 5 | Ethyl acetate | MeTHF |
| 6 | Ethyl acetate | 1-Butanol |
| 7 | Ethyl acetate | Acetonylacetone |

Example 1: MeTHF and Acetonylacetone

The salt recovery solution was prepared using MeTHF and acetonylacetone. These individual components were combined at different molar ratios and the ZLD ratio for NaCl brine solution (300 000 ppm) was determined and shown below in Table 2.

TABLE 2

| Mole ratio of MeTHF | Mole ratio of acetonylacetone | Volume of MeTHF, mL | Volume of Acetonylacetone, mL | Volume of salt recovery solution, mL | Brine added, mL | ZLD ratio |
|---|---|---|---|---|---|---|
| 0.10 | 0.90 | 0.87 | 9.13 | 10.00 | 1.30 | 7.69 |
| 0.20 | 0.80 | 1.77 | 8.23 | 10.00 | 1.10 | 9.09 |
| 0.33 | 0.67 | 3.01 | 6.99 | 10.00 | 0.85 | 11.70 |
| 0.40 | 0.60 | 3.64 | 6.36 | 10.00 | 0.80 | 12.50 |
| 0.50 | 0.50 | 4.62 | 5.38 | 10.00 | 0.70 | 14.29 |
| 0.60 | 0.40 | 5.63 | 4.37 | 10.00 | 0.60 | 16.67 |
| 0.67 | 0.33 | 6.32 | 3.68 | 10.00 | 0.50 | 20.00 |
| 0.75 | 0.25 | 7.21 | 2.79 | 10.00 | 0.35 | 28.57 |
| 0.85 | 0.15 | 8.30 | 1.70 | 10.00 | 0.30 | 33.33 |
| 0.95 | 0.05 | 9.42 | 0.58 | 10.00 | 0.20 | 50.00 |

Example 2: MeTHF and 1-Butanol

The salt recovery solution was prepared using MeTHF and 1-butanol. These individual components were combined at different molar ratios and the ZLD ratio for NaCl brine solution (300 000 ppm) was determined and shown below in Table 3:

TABLE 3

| Mole ratio of MeTHF | Mole ratio of 1-butanol | Volume of MeTHF, mL | Volume of 1-butanol, mL | Volume of salt recovery solution, mL | Brine added, mL | ZLD ratio |
|---|---|---|---|---|---|---|
| 0.10 | 0.90 | 3.20 | 26.00 | 13.00 | 1.00 | 13.00 |
| 0.20 | 0.80 | 5.00 | 18.30 | 11.00 | 1.00 | 11.00 |
| 0.30 | 0.70 | 7.50 | 16.01 | 12.00 | 1.00 | 12.00 |
| 0.40 | 0.60 | 10.00 | 13.72 | 12.00 | 1.00 | 12.00 |
| 0.50 | 0.50 | 12.50 | 11.43 | 12.00 | 0.80 | 15.00 |
| 0.60 | 0.40 | 15.00 | 9.14 | 12.00 | 0.80 | 15.00 |
| 0.70 | 0.30 | 17.50 | 6.85 | 15.00 | 0.80 | 18.75 |
| 0.80 | 0.20 | 20.00 | 4.58 | 17.00 | 0.20 | 85.00 |
| 0.90 | 0.10 | 22.50 | 2.27 | 17.50 | 0.20 | 87.50 |

Example 3: MeTHF and 1-Pentanol

The salt recovery solution was prepared using MeTHF and 1-pentanol. These individual components were combined at different molar ratios and the ZLD ratio for NaCl brine solution (300 000 ppm) was determined and show below in Table 4.

TABLE 4

| Mole ratio of MeTHF | Mole ratio of 1-pentanol | Volume of MeTHF, mL | Volume of 1-pentanol, mL | Volume of salt recovery solution, mL | Brine added, mL | ZLD ratio |
|---|---|---|---|---|---|---|
| 0.10 | 0.90 | 0.93 | 9.07 | 10.00 | 0.50 | 20.00 |
| 0.20 | 0.80 | 1.88 | 8.12 | 10.00 | 0.50 | 20.00 |
| 0.33 | 0.67 | 3.17 | 6.83 | 10.00 | 0.50 | 20.00 |
| 0.40 | 0.60 | 3.82 | 6.18 | 10.00 | 0.50 | 20.00 |
| 0.50 | 0.50 | 4.81 | 5.19 | 10.00 | 0.50 | 20.00 |
| 0.60 | 0.40 | 5.82 | 4.18 | 10.00 | 0.40 | 25.00 |
| 0.67 | 0.33 | 6.50 | 3.50 | 10.00 | 0.40 | 25.00 |
| 0.75 | 0.25 | 7.36 | 2.64 | 10.00 | 0.40 | 25.00 |
| 0.85 | 0.15 | 8.40 | 1.60 | 10.00 | 0.30 | 33.33 |
| 0.95 | 0.05 | 9.46 | 0.54 | 10.00 | 0.20 | 50.00 |

Example 4: Ethyl acetate and 2-Butanone

The salt recovery solution was prepared using ethanol acetate and 2-butanone. These individual components were combined at different molar ratios and the ZLD ratio for NaCl brine solution (300 000 ppm) was determined and shown below in Table 5.

TABLE 5

| Mole ratio of ethyl acetate | Mole ratio of 2-butanone | Volume of ethyl acetate, mL | Volume of 2-butanone, mL | Volume of salt recovery solution, mL | Brine added, mL | ZLD ratio |
|---|---|---|---|---|---|---|
| 0.10 | 0.90 | 1.10 | 8.90 | 10.00 | 0.30 | 33.33 |
| 0.20 | 0.80 | 2.10 | 7.90 | 10.00 | 0.30 | 33.33 |
| 0.33 | 0.67 | 3.50 | 6.50 | 10.00 | 0.25 | 40.00 |
| 0.40 | 0.60 | 4.15 | 5.85 | 10.00 | 0.20 | 50.00 |
| 0.50 | 0.50 | 5.15 | 4.85 | 10.00 | 0.10 | 100.00 |
| 0.60 | 0.40 | 6.14 | 3.86 | 10.00 | 0.09 | 111.11 |
| 0.67 | 0.33 | 6.80 | 3.20 | 10.00 | 0.09 | 117.65 |
| 0.75 | 0.25 | 7.61 | 2.39 | 10.00 | 0.08 | 125.00 |
| 0.85 | 0.15 | 8.58 | 1.42 | 10.00 | 0.08 | 125.00 |
| 0.95 | 0.05 | 9.53 | 0.47 | 10.00 | 0.08 | 125.00 |

Example 5: Ethyl acetate and MeTHF

The salt recovery solution was prepared using ethanol acetate and MeTHF. These individual components were combined at different molar ratios and the ZLD ratio for NaCl brine solution (300 000 ppm) was determined and shown in Table 6.

TABLE 6

| Mole ratio of ethyl acetate | Mole ratio of MeTHF | Volume of ethyl acetate, mL | Volume of MeTHF, mL | Volume of salt recovery solution, mL | Brine added, mL | ZLD ratio |
|---|---|---|---|---|---|---|
| 0.10 | 0.90 | 0.97 | 9.03 | 10.00 | 0.10 | 100.00 |
| 0.20 | 0.80 | 1.95 | 8.05 | 10.00 | 0.09 | 111.11 |
| 0.33 | 0.67 | 3.26 | 6.74 | 10.00 | 0.09 | 111.11 |
| 0.40 | 0.60 | 3.92 | 6.08 | 10.00 | 0.09 | 117.65 |
| 0.50 | 0.50 | 4.92 | 5.08 | 10.00 | 0.08 | 125.00 |
| 0.60 | 0.40 | 5.92 | 4.08 | 10.00 | 0.07 | 142.86 |
| 0.67 | 0.33 | 6.60 | 3.40 | 10.00 | 0.07 | 153.85 |
| 0.75 | 0.25 | 7.44 | 2.56 | 10.00 | 0.07 | 153.85 |
| 0.85 | 0.15 | 8.46 | 1.54 | 10.00 | 0.06 | 181.82 |
| 0.95 | 0.05 | 9.48 | 0.52 | 10.00 | 0.05 | 200.00 |

Example 6: Ethyl Acetate and 1-Butanol

The salt recovery solution was prepared using ethyl acetate and 1-butanol. These individual components were combined at different molar ratios and the ZLD ratio for NaCl brine solution (300 000 ppm) was determined and shown in Table 7.

TABLE 7

| Mole ratio of ethyl acetate | Mole ratio of 1-butanol | Volume of ethyl acetate, mL | Volume of 1-butanol, mL | Volume of salt recovery solution, mL | Brine added, mL | ZLD ratio |
|---|---|---|---|---|---|---|
| 0.10 | 0.90 | 1.06 | 8.94 | 10.00 | 0.75 | 13.33 |
| 0.20 | 0.80 | 2.11 | 7.89 | 10.00 | 0.70 | 14.29 |
| 0.33 | 0.67 | 3.48 | 6.52 | 10.00 | 0.45 | 22.22 |
| 0.40 | 0.60 | 4.15 | 5.85 | 10.00 | 0.45 | 22.22 |
| 0.50 | 0.50 | 5.16 | 4.84 | 10.00 | 0.50 | 20.00 |
| 0.60 | 0.40 | 6.16 | 3.84 | 10.00 | 0.38 | 26.32 |
| 0.67 | 0.33 | 6.81 | 3.19 | 10.00 | 0.35 | 28.57 |
| 0.75 | 0.25 | 7.62 | 2.38 | 10.00 | 0.25 | 40.00 |
| 0.85 | 0.15 | 8.58 | 1.42 | 10.00 | 0.20 | 50.00 |
| 0.95 | 0.05 | 9.53 | 0.47 | 10.00 | 0.10 | 100.00 |

Example 7: Ethyl Acetate and Acetonylacetone

The salt recovery solution was prepared using ethyl acetate and acetonylacetone. These individual components were combined at different molar ratios and the ZLD ratio for NaCl brine solution (300 000 ppm) was determined and shown in Table 8.

TABLE 8

| Mole ratio of ethyl acetate | Mole ratio of acetonylacetone | Volume of ethyl acetate, mL | Volume of Acetonylacetone, mL | Volume of salt recovery solution, mL | Brine added, mL | ZLD ratio |
|---|---|---|---|---|---|---|
| 0.10 | 0.90 | 0.85 | 9.15 | 10.00 | 1.10 | 9.09 |
| 0.20 | 0.80 | 1.72 | 8.28 | 10.00 | 1.10 | 9.09 |
| 0.33 | 0.67 | 2.94 | 7.06 | 10.00 | 0.75 | 13.33 |
| 0.40 | 0.60 | 3.57 | 6.43 | 10.00 | 0.70 | 14.29 |
| 0.50 | 0.50 | 4.54 | 5.46 | 10.00 | 0.50 | 20.00 |
| 0.67 | 0.33 | 6.25 | 3.75 | 10.00 | 0.35 | 28.57 |
| 0.75 | 0.25 | 7.14 | 2.86 | 10.00 | 0.30 | 33.33 |
| 0.85 | 0.15 | 8.25 | 1.75 | 10.00 | 0.25 | 40.00 |
| 0.95 | 0.05 | 9.41 | 0.59 | 10.00 | 0.20 | 50.00 |

Example 8: Methyl acetate and 2-Butanone

The salt recovery solution was prepared using methyl acetate and 2-butanone. These individual components were combined at different molar ratios and the ZLD ratio for NaCl brine solution (300 000 ppm) was determined and shown in Table 9.

TABLE 9

| Mole ratio of Methyl Acetate | Mole ratio of 2-Butanone | Volume of Methyl Acetate, mL | Volume of 2-Butanone, mL | Volume of salt recovery solution, mL | Brine added, mL | ZLD ratio |
|---|---|---|---|---|---|---|
| 0.10 | 0.90 | 0.90 | 9.10 | 10.00 | 0.33 | 30.00 |
| 0.20 | 0.80 | 1.82 | 8.18 | 10.00 | 0.33 | 30.00 |
| 0.33 | 0.67 | 3.07 | 6.93 | 10.00 | 0.33 | 30.00 |
| 0.40 | 0.60 | 3.72 | 6.28 | 10.00 | 0.33 | 30.00 |
| 0.50 | 0.50 | 4.70 | 5.30 | 10.00 | 0.33 | 30.00 |
| 0.60 | 0.40 | 5.71 | 4.29 | 10.00 | 0.33 | 30.00 |
| 0.67 | 0.33 | 6.40 | 3.60 | 10.00 | 0.33 | 30.00 |
| 0.75 | 0.25 | 7.27 | 2.73 | 10.00 | 0.33 | 30.00 |
| 0.85 | 0.15 | 8.34 | 1.66 | 10.00 | 0.33 | 30.00 |
| 0.95 | 0.05 | 9.44 | 0.56 | 10.00 | 0.33 | 30.00 |

Example 9: Ethanol acetate and Di(propylene glycol) dimethyl ether, mixture of isomers The salt recovery solution was prepared using ethanol acetate and Di(propylene glycol) dimethyl ether, mixture of isomers. These individual components were combined at different molar ratios and the ZLD ratio for NaCl brine solution (300 000 ppm) was determined and shown in Table 10.

TABLE 10

| Mole ratio of Ethanol Acetate | Mole ratio of Di(propylene glycol) dimethyl ether, mixture of isomers | Volume of Ethanol Acetate, mL | Volume of Di(propylene glycol) dimethyl ether, mixture of isomers, mL | Volume of salt recovery solution, mL | Brine added, mL | ZLD ratio |
|---|---|---|---|---|---|---|
| 0.10 | 0.90 | 0.57 | 9.43 | 10.00 | 0.20 | 50.00 |
| 0.20 | 0.80 | 1.20 | 8.80 | 10.00 | 0.20 | 50.00 |
| 0.33 | 0.67 | 2.14 | 7.86 | 10.00 | 0.20 | 50.00 |
| 0.40 | 0.60 | 2.66 | 7.34 | 10.00 | 0.20 | 50.00 |
| 0.50 | 0.50 | 3.52 | 6.48 | 10.00 | 0.20 | 50.00 |
| 0.60 | 0.40 | 4.49 | 5.51 | 10.00 | 0.20 | 50.00 |
| 0.67 | 0.33 | 5.21 | 4.79 | 10.00 | 0.20 | 50.00 |
| 0.75 | 0.25 | 6.20 | 3.80 | 10.00 | 0.10 | 100.00 |
| 0.85 | 0.15 | 7.55 | 2.45 | 10.00 | 0.10 | 100.00 |
| 0.95 | 0.05 | 9.12 | 0.88 | 10.00 | 0.10 | 100.00 |

Example 10: Ethanol Acetate and 2-Phenoxyethanol

The salt recovery solution was prepared using ethanol acetate and 2-Phenoxyethanol. These individual components were combined at different molar ratios and the ZLD ratio for NaCl brine solution (300 000 ppm) was determined and shown in Table 11.

TABLE 11

| Mole ratio of Ethanol Acetate | Mole ratio of 2-Phenoxyethanol | Volume of Ethanol Acetate, mL | Volume of 2-Phenoxyethanol, mL | Volume of salt recovery solution, mL | Brine added, mL | ZLD ratio |
|---|---|---|---|---|---|---|
| 0.10 | 0.90 | 0.74 | 9.26 | 10.00 | 0.67 | 15.00 |
| 0.20 | 0.80 | 1.53 | 8.47 | 10.00 | 0.67 | 15.00 |
| 0.33 | 0.67 | 2.65 | 7.35 | 10.00 | 0.67 | 15.00 |
| 0.40 | 0.60 | 3.25 | 6.75 | 10.00 | 0.50 | 20.00 |
| 0.50 | 0.50 | 4.19 | 5.81 | 10.00 | 0.50 | 20.00 |
| 0.60 | 0.40 | 5.20 | 4.80 | 10.00 | 0.50 | 20.00 |
| 0.67 | 0.33 | 5.91 | 4.09 | 10.00 | 0.33 | 30.00 |
| 0.75 | 0.25 | 6.84 | 3.16 | 10.00 | 0.33 | 30.00 |
| 0.85 | 0.15 | 8.03 | 1.97 | 10.00 | 0.20 | 50.00 |
| 0.95 | 0.05 | 9.32 | 0.68 | 10.00 | 0.20 | 50.00 |

Example 11: Ethanol Acetate and
2-Dimethoxypropane

The salt recovery solution was prepared using ethanol acetate and 2-Dimethoxypropane. These individual components were combined at different molar ratios and the ZLD ratio for NaCl brine solution (300 000 ppm) was determined and shown in Table 12.

TABLE 12

| Mole ratio of Ethanol Acetate | Mole ratio of 2-Dimethoxypropane | Volume of Ethanol Acetate, mL | Volume of 2-Dimethoxypropane, mL | Volume of salt recovery solution, mL | Brine added, mL | ZLD ratio |
|---|---|---|---|---|---|---|
| 0.10 | 0.90 | 0.81 | 9.19 | 10.00 | 0.03 | 300.00 |
| 0.20 | 0.80 | 1.66 | 8.34 | 10.00 | 0.10 | 100.00 |
| 0.33 | 0.67 | 2.85 | 7.15 | 10.00 | 0.10 | 100.00 |
| 0.40 | 0.60 | 3.47 | 6.53 | 10.00 | 0.10 | 100.00 |
| 0.50 | 0.50 | 4.44 | 5.56 | 10.00 | 0.10 | 100.00 |
| 0.60 | 0.40 | 5.45 | 4.55 | 10.00 | 0.10 | 100.00 |
| 0.67 | 0.33 | 6.15 | 3.85 | 10.00 | 0.10 | 100.00 |
| 0.75 | 0.25 | 7.05 | 2.95 | 10.00 | 0.10 | 100.00 |
| 0.85 | 0.15 | 8.19 | 1.81 | 10.00 | 0.10 | 100.00 |
| 0.95 | 0.05 | 9.38 | 0.62 | 10.00 | 0.10 | 100.00 |

Example 12: Ethanol Acetate and Cyclohexanone

The salt recovery solution was prepared using ethanol acetate and cyclohexanone. These individual components were combined at different molar ratios and the ZLD ratio for NaCl brine solution (300 000 ppm) was determined and shown in Table 13.

TABLE 13

| Mole ratio of Ethanol Acetate | Mole ratio of 2-Dimethoxypropane | Volume of Ethanol Acetate, mL | Volume of Cyclohexanone, mL | Volume of salt recovery solution, mL | Brine added, mL | ZLD ratio |
|---|---|---|---|---|---|---|
| 0.10 | 0.90 | 0.95 | 9.05 | 10.00 | 0.20 | 50.00 |
| 0.20 | 0.80 | 1.91 | 8.09 | 10.00 | 0.20 | 50.00 |
| 0.33 | 0.67 | 3.21 | 6.79 | 10.00 | 0.20 | 50.00 |
| 0.40 | 0.60 | 3.86 | 6.14 | 10.00 | 0.20 | 50.00 |
| 0.50 | 0.50 | 4.85 | 5.15 | 10.00 | 0.20 | 50.00 |
| 0.60 | 0.40 | 5.86 | 4.14 | 10.00 | 0.20 | 50.00 |
| 0.67 | 0.33 | 6.54 | 3.46 | 10.00 | 0.20 | 50.00 |
| 0.75 | 0.25 | 7.39 | 2.61 | 10.00 | 0.10 | 100.00 |
| 0.85 | 0.15 | 8.42 | 1.58 | 10.00 | 0.10 | 100.00 |
| 0.95 | 0.05 | 9.47 | 0.53 | 10.00 | 0.10 | 100.00 |

Example 13: MeTHF and Methyl Acetate

The salt recovery solution was prepared using MeTHF and methyl acetate. These individual components were combined at different molar ratios and the ZLD ratio for NaCl brine solution (300 000 ppm) was determined and shown in Table 14.

TABLE 14

| Mole ratio of MeTHF | Mole ratio of Methyl Acetate | Volume of MeTHF, mL | Volume of Methyl Acetate, mL | Volume of salt recovery solution, mL | Brine added, mL | ZLD ratio |
|---|---|---|---|---|---|---|
| 0.10 | 0.90 | 1.24 | 8.76 | 10.00 | 0.20 | 50.00 |
| 0.20 | 0.80 | 2.41 | 7.59 | 10.00 | 0.20 | 50.00 |
| 0.33 | 0.67 | 3.88 | 6.12 | 10.00 | 0.20 | 50.00 |
| 0.40 | 0.60 | 4.58 | 5.42 | 10.00 | 0.20 | 50.00 |
| 0.50 | 0.50 | 5.59 | 4.41 | 10.00 | 0.20 | 50.00 |
| 0.60 | 0.40 | 6.56 | 3.44 | 10.00 | 0.20 | 50.00 |
| 0.67 | 0.33 | 7.17 | 2.83 | 10.00 | 0.20 | 50.00 |
| 0.75 | 0.25 | 7.92 | 2.08 | 10.00 | 0.20 | 50.00 |
| 0.85 | 0.15 | 8.78 | 1.22 | 10.00 | 0.20 | 50.00 |
| 0.95 | 0.05 | 9.60 | 0.40 | 10.00 | 0.20 | 50.00 |

The results of these salt recovery solutions show that it is possible to get very effective salt recovery solutions with low ZLD ratios to effectively separate salt from water in a brine solution. These results demonstrate the potential and applicability of these salt recovery solutions to achieve ZLD with industrial brines with lower energy requirements. With many ZLD ratios shown to be below 50 and many below 30 these results are promising. While the ZLD ratios in Example 5 are greater than 50, it is to be appreciated that changes could be made to the components of Example 5, such as the addition of a further component to produce a ternary system that may significantly alter the ZLD potential.

Example 14: Modifying the salt recovery solution into a ternary system

In the examples 1 to 7 above, the salt recovery solutions were formulated to include two components (a binary system). In the following examples an additional component was added to see the effect of a ternary system on the ZLD ratios and the water absorption capacity of the resulting salt recovery solutions.

Ternary salt recovery solutions were mixed with standard aqueous solution made up of NaCl at a concentration of 300 000 ppm. The ratio at which there was complete salt precipitation i.e., zero-liquid discharge (ZLD) condition was determined.

Some of the combinations (both binary and ternary systems) were also tested against synthetic commercial brine sample whose composition matched closely to that of a mining waste stream.

The following ternary salt recovery solutions were prepared as set out in Table 15. The salt recovery solution was made up of three compounds—compound A, compound B and compound C. In this example, compound A was MeTHF and compound B was 1-butanol. The additional Compound C used was—acetonylacetone, 1-propanol, 1-pentanol, 3-methyl-1-butanol and 1,4-butanediol. The following table shows the different compounds selected as part of the salt recovery solution composition:

TABLE 15

| Compound A | Compound B | Compound C |
|---|---|---|
| MeTHF | 1-Butanol | Acetonylacetone |
| MeTHF | 1-Butanol | 1-Propanol |
| MeTHF | 1-Butanol | 1-Pentanol |
| MeTHF | 1-Butanol | 3-Methyl-1-butanol |
| MeTHF | 1-Butanol | 1,4-Butanediol |

The molar ratio of Compound C was varied from 0.1 to 0.3 and its effect on the water absorption capacity of the salt recovery solution was determined. The ZLD ratio of the ternary salt recovery solution was determined for standard NaCl brine at a concentration of 300 000 ppm.

A brine sample was prepared comprising sodium chloride (NaCl) in deionised water at a concentration of 300 000 ppm.

5 mL of the salt recovery solution was taken in centrifuge tubes. The brine sample was added in the increments of 100uL and the ZLD ratio was determined. The following Table 16 shows the various mole ratios of the compounds in the salt recovery solution and its ZLD ratio for standard NaCl brine:

TABLE 16

| Compound A | Compound B | Compound C | Mole ratio of Compound A: Compound B: Compound C | Volume of salt recovery solution, mL | Brine added, mL | ZLD ratio for NaCl brine (300 000 ppm) |
|---|---|---|---|---|---|---|
| MeTHF | 1-Butanol | Acetonylacetone | 0.5:0.4:0.1 | 5 | 0.35 | 14.3 |
| MeTHF | 1-Butanol | Acetonylacetone | 0.5:0.3:0.2 | 5 | 0.36 | 13.9 |
| MeTHF | 1-Butanol | Acetonylacetone | 0.5:0.2:0.3 | 5 | 0.4 | 12.5 |
| MeTHF | 1-Butanol | 1-Propanol | 0.5:0.4:0.1 | 5 | 0.4 | 16.7 |
| MeTHF | 1-Butanol | 1-Propanol | 0.5:0.3:0.2 | 5 | 0.45 | 16.7 |
| MeTHF | 1-Butanol | 1-Propanol | 0.5:0.2:0.3 | 5 | 0.47 | 25.0 |
| MeTHF | 1-Butanol | 1-Pentanol | 0.5:0.4:0.1 | 5 | 0.3 | 16.7 |
| MeTHF | 1-Butanol | 1-Pentanol | 0.5:0.3:0.2 | 5 | 0.3 | 16.7 |
| MeTHF | 1-Butanol | 1-Pentanol | 0.5:0.2:0.3 | 5 | 0.2 | 25.0 |
| MeTHF | 1-Butanol | 3-Methyl-1-butanol | 0.5:0.4:0.1 | 5 | 0.3 | 16.7 |
| MeTHF | 1-Butanol | 3-Methyl-1-butanol | 0.5:0.3:0.2 | 5 | 0.3 | 16.7 |
| MeTHF | 1-Butanol | 3-Methyl-1-butanol | 0.5:0.2:0.3 | 5 | 0.25 | 20.0 |
| MeTHF | 1-Butanol | 1,4-Butanediol | 0.5:0.4:0.1 | 5 | 0.4 | 12.5 |
| MeTHF | 1-Butanol | 1,4-Butanediol | 0.5:0.3:0.2 | 5 | 0.4 | 12.5 |
| MeTHF | 1-Butanol | 1,4-Butanediol | 0.5:0.2:0.3 | 5 | 1 | 5.0 |

It can be seen from Table 16 that the ZLD ratio can be changed quite markedly with the addition of a third component, when comparing against the ZLD ratio observed for the two component system MeTHF and 1-Butanol at 0.5:0.5 molar ratio having a ZLD of 15 (see Table 3 of Example 2 above). The ternary system of MeTHF, 1-Butanol and 1,4-butanediol at molar ratios of 0.5:0.2:0.3 respectively provided a ZLD ratio of 5, which appears to be extremely promising.

A synthetic brine solution, which mimics low pH commercial brines from a mining waste stream was prepared using aluminium sulfate ($Al_2(SO_4)_3 \cdot 18H_2O$), calcium chloride ($CaCl_2$), calcium sulfate ($CaSO_4$), iron sulfate ($FeSi_4 \cdot 7H_2O$) and magnesium sulfate ($MgSO_4$). The composition of the synthetic commercial brine comprised mostly sulfate salts with a pH of 1.74. The composition was as shown in Table 17.

TABLE 17

| Composition of synthetic commercial brine | |
|---|---|
| Salt | Concentration (g/L) |
| Aluminium sulfate($Al_2(SO_4)_3$) | 65.8 |
| Calcium chloride ($CaCl_2$) | 2.0 |

TABLE 17-continued

| Composition of synthetic commercial brine | |
|---|---|
| Salt | Concentration (g/L) |
| Calcium sulfate ($CaSO_4$) | 1.5 |
| Iron sulfate ($FeSO_4$) | 25.0 |
| Magnesium sulfate ($MgSO_4$) | 80.0 |
| Total TDS, g/L | 174.3 |

Some of the binary and ternary systems trialled above were tested against the synthetic commercial brine. The brine solution was added to the salt recovery solution in increments of 100 μl to the volumes shown below in Table 18 until the point when the brine solution was passing through the salt recovery solution and forming a "heavy brine layer" under the salt recovery solution. Heavy brine is simply the brine solution depleted in water. The samples were mixed in a vortex mixer for 30 seconds. After ensuring thorough mixing, the samples were centrifuged for 1 minute for the precipitated salts to settle at the bottom of the sample tubes. The ZLD ratios were determined by calculating the ratio between volume of salt recovery solution (ml) divided by the brine added (ml) The results are shown in Table 18.

TABLE 18

| Different variations of salt recovery solution combinations | | | | | | |
|---|---|---|---|---|---|---|
| Compound A | Compound B | Compound C | Mole ratio of Compound A: Compound B: Compound C | Volume of salt recovery solution, mL | Brine added, mL | ZLD ratio |
| MeTHF | Acetonylacetone | — | 1:2 | 10 | 1.50 | 6.67 |
| MeTHF | 1-Butanol | — | 1:2 | 10 | 0.85 | 11.76 |
| MeTHF | Ethyl acetate | — | 1:2 | 10 | 0.15 | 66.67 |
| Ethanol Acetate | 1-Butanol | — | 1:2 | 10 | 0.85 | 11.76 |
| MeTHF | 1-Butanol | Acetonylacetone | 0.5:0.3:0.2 | 5 | 0.40 | 12.50 |
| MeTHF | 1-Butanol | 1-Propanol | 0.5:0.3:02 | 5 | 0.40 | 12.50 |
| MeTHF | 1-Butanol | 1-Pentanol | 0.5:0.3:0.2 | 5 | 0.30 | 16.67 |
| MeTHF | 1-Butanol | 3-Methyl-1-butanol | 0.5:0.3:0.2 | 5 | 0.30 | 16.67 |

TABLE 18-continued

Different variations of salt recovery solution combinations

| Compound A | Compound B | Compound C | Mole ratio of Compound A: Compound B: Compound C | Volume of salt recovery solution, mL | Brine added, mL | ZLD ratio |
|---|---|---|---|---|---|---|
| MeTHF | 1-Butanol | 1,4-Butanediol | 0.5:0.3:0.2 | 5 | 0.90 | 5.56 |
| Methyl Acetate | 2-Butanone | — | 3:2 | 10 | 0.50 | 20 |
| Ethanol Acetate | Di(propylene glycol) dimethyl ether, mixture of isomers | — | 3:2 | 10 | 0.20 | 50 |
| Ethyl Acetate | 2-Phenoxyethanol | — | 1:2 | 10 | 0.50 | 20 |
| Ethyl Acetate | 2-Dimethoxypropane | — | 3:2 | 10 | 0.167 | 60 |
| Ethyl Acetate | Cyclohexanone | — | 2:1 | 10 | 0.33 | 30 |
| MeTHF | Methyl Acetate | — | 3:2 | 10 | 0.33 | 30 |

It can be seen from the results in the table that a wide range of ZLD ratios were observed with the synthetic commercial brine. The ZLD ratios are all very promising, with the exception of the combination of ethyl acetate and MeTHF and the combination of ethyl acetate and 2,2-dimethoxypropane. However, it is anticipated that further refinement of the ethyl acetate and MeTHF system and the of ethyl acetate and 2,2-dimethoxypropane may be possible by converting into a ternary system, which might result in a lower ZLD ratio for similar synthetic brines. It is to be appreciated that a range of combinations could be useful and suitable depending on the application and results to be achieved. For example, it is envisaged that quaternary combinations may also be suitable for some applications.

With reference to FIG. 1, it is to be appreciated that different countercurrent absorption processes can also be utilised. FIG. 1 shows a 5-stage stage countercurrent absorption process to reach full crystallization, the ratio of salt recovery solution to brine was confirmed at 40:1 in a cascading configuration to reduce the amount of salt recovery solution (absorption) needed. The salt recovery solution was ethyl acetate to butanol. The brine was a commercial brine having a range of chlorides and sulphates, a pH of less than 2 and a density of 1.13 g/ml after filtration through a 0.45 um membrane.

FIG. 1 shows the water recoveries at each different absorption stages. At the fifth stage, full crystallization is achieved. By using five stages of absorption, the ZLD ratio was determined to be 40:1, which is significantly lower than the ZLD ratio of a single stage absorption (700:1). The ratio of 40:1 was obtained through many trials to optimize the salt recovery solution ratio, for five stages of countercurrent absorption. The ZLD ratio was the lowest ratio in which the brine reached full crystallization.

Figure 2:
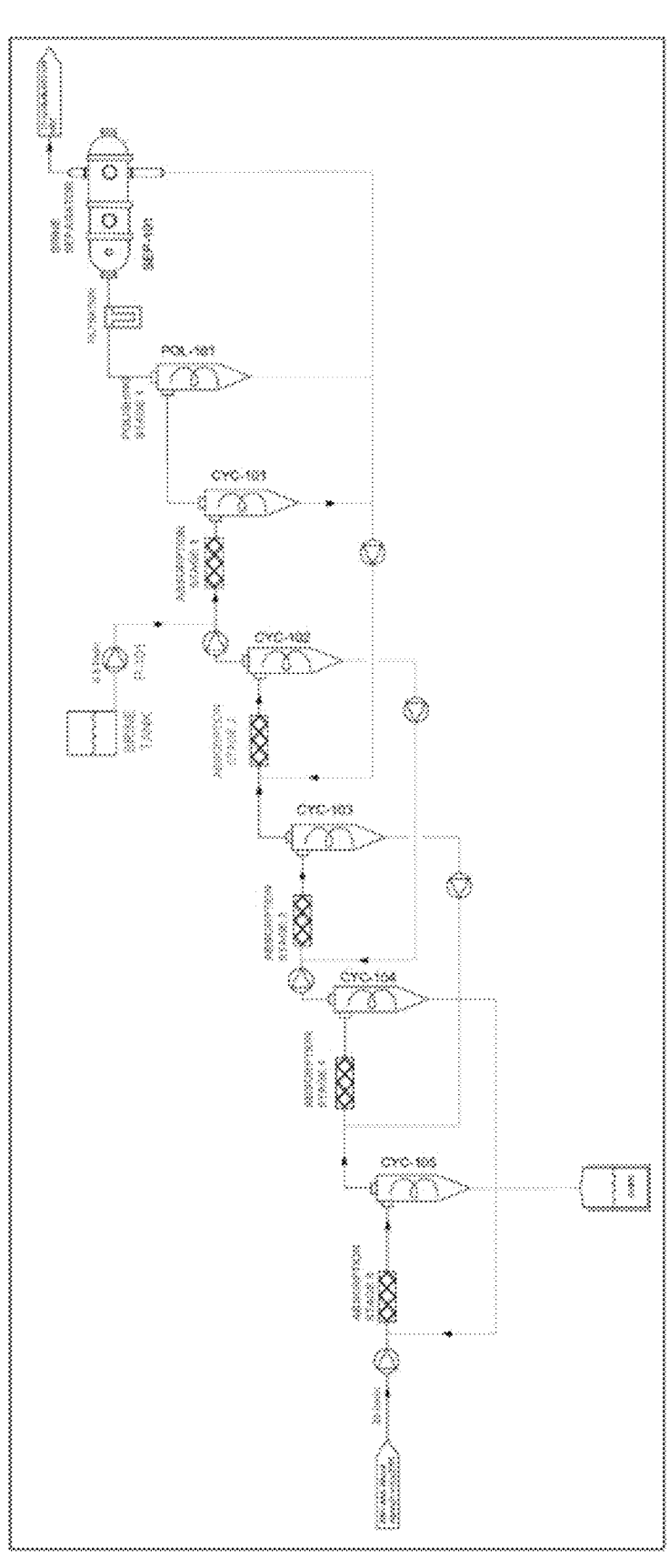
FIG. 2 shows a process flow diagram providing five stages of absorption where water is absorbed from a brine/salt solution in 5 stages.

With reference to FIG. 2 a process flow diagram is illustrated that shows how a 5 stage countercurrent absorption process might be set up. The brine or salt tank feeds into absorption stage 1, and once water has been absorbed from the brine into the salt recovery solution, the brine is then fed into absorption stage 2 to recover further water from the now water depleted brine. This cycle is repeated until all the water has been recovered from the brine. As shown in FIG. 1, 5 stages of water recovery or absorption were required to achieve ZLD.

The present invention and its embodiments have been described in detail. However, the scope of the present invention is not intended to be limited to the particular embodiments of any process, manufacture, composition of matter, compounds, means, methods, and/or steps described in the specification. Various modifications, substitutions, and variations can be made to the disclosed material without departing from the spirit and/or essential characteristics of the present invention. Accordingly, one of ordinary skill in the art will readily appreciate from the disclosure that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to combinations, kits, compounds, means, methods, and/or steps disclosed herein.

The invention claimed is:

1. A process for recovering an inorganic salt from a salt containing aqueous solution containing inorganic salts, the process comprising the steps of:

(i) adding the salt containing aqueous solution containing inorganic salts to a salt recovery solution; and (ii) allowing the inorganic salt to precipitate on passage through the salt recovery solution, wherein the salt recovery solution comprises at least two or more components independently selected from any combination of integers a), b), c) and d), wherein a) is a straight, branched or optionally substituted cyclic $C_4$-$C_9$ ether containing compound;

b) is a straight chain or branched $C_3$-$C_9$ alkyl substituted by —OH;

c) is a straight chain, branched or cyclic $C_4$-$C_9$ ketone; and d) is a straight chain or branched $C_3$-$C_9$ ester containing compound; and wherein at least one component of the salt recovery solution is substantially immiscible with an aqueous solution of sodium chloride at a 1 molar concentration at or above 20 degrees Celsius and at 1 atmosphere.

2. The process as claimed in claim 1, wherein the process is a) a zero-liquid discharge process;

b) a counter current process; or c) is a non-membrane process.

3. A process for concentrating a salt containing aqueous solution containing inorganic salts, the process comprising the steps of:

(i) adding the salt containing aqueous solution containing the inorganic salts to a salt recovery solution, wherein the salt recovery solution comprises at least two or more components independently selected from any combination of integers a), b), c) and d): wherein a) is a straight, branched or optionally substituted cyclic $C_4$-$C_9$ ether containing compound;

b) is a straight chain or branched $C_3$-$C_9$ alkyl substituted by —OH;

c) is a straight chain, branched or cyclic $C_4$-$C_9$ ketone or $C_4$-$C_9$ diketone; and d) is a straight chain or branched $C_3$-$C_9$ ester containing compound; and wherein at least one component of the salt recovery solution is substantially immiscible with an aqueous solution of sodium chloride at a 1 molar concentration at or above 20 degrees Celsius and at 1 atmosphere; and (ii) allowing water from the salt containing aqueous solution containing the inorganic salts to pass into the salt recovery solution.

4. The process as claimed in claim 3, wherein the process is:

i) a non-membrane process;

ii) a non-osmotic process; or iii) a non-membrane and non-osmotic process.

5. The process as claimed in claim 3, wherein the process concentrates the salt containing aqueous solution containing the inorganic salts by a value selected from:

a) at least 20%;

b) by at least 30%;

c) by at least 40%;

d) by at least 50%;

e) by at least 60%;

f) by at least 70%;

g) by at least 80%; and h) by at least 90%.

6. The process as claimed in claim 3, wherein the process is a minimal discharge process or a zero-liquid discharge process.

7. The process as claimed in claim 3, wherein the salt containing aqueous solution is an industrial brine.

8. The process as claimed in claim 3, wherein the straight, branched or optionally substituted cyclic $C_4$-$C_9$ ether containing compound is selected from one or more of a diether, a polyether, 2-methyltetrahydrofuran, 3-methyltetrahydrofuran, 2-ethyltetrahydrofuran, 3-ethyltetrahydrofuran, dioxane, 1-ethoxypropane, a $C_4$-$C_9$ glycol ether, propylene glycol methyl ether, dipropylene glycol methyl ethyl acetate, dipropylene glycol n-propyl ether, propylene glycol n-butyl ether, dipropylene glycol n-butyl ether, tripropylene glycol n-butyl ether, propylene glycol phenyl ether, propylene glycol diacetate, and combinations thereof.

9. The process as claimed in claim 3, wherein the straight chain or branched $C_3$-$C_9$ alkyl substituted by —OH is selected from one or more of: 1-butanol, 2-butanol, 1-pentanol, and combinations thereof.

10. The process as claimed in claim 1, wherein the straight chain, branched or cyclic $C_4$-$C_9$ ketone or $C_4$-$C_9$ diketone is selected from one or more of: acetonylacetone, 2-butanone, and cyclohexanone.

11. The process as claimed in claim 3, wherein the straight chain or branched $C_3$-$C_9$ ester containing compound is methyl acetate or ethyl acetate.

12. The process as claimed in claim 1, wherein the straight, branched or optionally substituted cyclic $C_4$-$C_9$ ether containing compound is a diether or polyether.

13. The process as claimed in claim 1, wherein the straight, branched or optionally substituted cyclic $C_4$-$C_9$ ether containing compound is selected from one or more of: 2-methyltetrahydrofuran, 3-methyltetrahydrofuran, 2-ethyltetrahydrofuran, 3-ethyltetrahydrofuran, dioxane, 1-ethoxypropane, a $C_4$-$C_9$ glycol ether, propylene glycol methyl ether, dipropylene glycol methyl ethyl acetate, dipropylene glycol n-propyl ether, propylene glycol n-butyl ether, dipropylene glycol n-butyl ether, tripropylene glycol n-butyl ether, propylene glycol phenyl ether, propylene glycol diacetate, and combinations thereof.

14. The process as claimed in claim 1, wherein the straight chain or branched $C_3$-$C_9$ alkyl substituted by —OH is selected from one or more of: 1-butanol, 2-butanol, 1-pentanol, and combinations thereof.

15. The process as claimed in claim 1, wherein the straight chain, branched or cyclic $C_4$-$C_9$ ketone is selected from one or more of: 2-butanone and cyclohexanone.

16. The process as claimed in claim 1, wherein the straight chain or branched $C_3$-$C_9$ ester containing compound is methyl acetate or ethyl acetate.

17. The process as claimed in claim 1, wherein the salt recovery solution is a combination of:

a) 2-methyltetrahydrofuran and 1-butanol;

b) 2-methyltetrahydrofuran and 1-pentanol;

c) ethyl acetate and 2-butanone;

d) ethyl acetate and 2-methyltetrahydrofuran; or e) ethyl acetate and 1-butanol.

18. The process as claimed in claim 1, wherein the salt containing aqueous solution is an industrial brine.

\* \* \* \* \*